US009535791B2

(12) United States Patent
Konta et al.

(10) Patent No.: US 9,535,791 B2
(45) Date of Patent: Jan. 3, 2017

(54) STORAGE CONTROL DEVICE, NON-TRANSITORY COMPUTER-READABLE RECORDING MEDIUM HAVING STORED THEREIN PROGRAM, AND CONTROL METHOD

(71) Applicant: FUJITSU LIMITED, Kawasaki-shi, Kanagawa (JP)

(72) Inventors: Yoshihito Konta, Kawasaki (JP); Norihide Kubota, Kawasaki (JP); Kenji Kobayashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 144 days.

(21) Appl. No.: 14/525,268

(22) Filed: Oct. 28, 2014

(65) Prior Publication Data

US 2015/0143169 A1 May 21, 2015

(30) Foreign Application Priority Data

Nov. 20, 2013 (JP) .................................. 2013-239897

(51) Int. Cl.
  *G06F 11/00* (2006.01)
  *G06F 11/10* (2006.01)
  (Continued)

(52) U.S. Cl.
  CPC ........... *G06F 11/1092* (2013.01); *G06F 3/061* (2013.01); *G06F 3/0604* (2013.01); *G06F 3/0607* (2013.01); *G06F 3/0613* (2013.01); *G06F 3/0631* (2013.01); *G06F 3/0635* (2013.01); *G06F 3/0683* (2013.01); *G06F 11/2041* (2013.01); *G06F 11/2094* (2013.01)

(58) Field of Classification Search
  USPC ........................................................ 714/6.2
  See application file for complete search history.

(56) References Cited

U.S. PATENT DOCUMENTS 7,146,522 B1 12/2006 Rowe et al.
2006/0075283 A1* 4/2006 Hartung .............. G06F 11/1092
    714/6.2
(Continued)

FOREIGN PATENT DOCUMENTS

JP    7-110743    4/1995
JP    2010-009442    1/2010

OTHER PUBLICATIONS

Extended European Search Report mailed on Mar. 31, 2015 for corresponding European Patent Application No. 14191062.0, 6 pages.

*Primary Examiner* — Sarai Butler
(74) *Attorney, Agent, or Firm* — Fujitsu Patent Center

(57) ABSTRACT

There is provided a storage control device that is communicably connected to a plurality of storage devices and a plurality of spare storage devices through a plurality of paths. The storage control device includes: a memory configured to store path information associating the plurality of spare storage devices and the plurality of paths with each other; and a selection unit configured to select a spare storage device that is a replacing apparatus from among the plurality of spare storage devices based on a path connection condition determined in accordance with a path in which the storage device that is a replacement target among the plurality of storage devices is connected and the path information.

20 Claims, 10 Drawing Sheets

(51) Int. Cl.
*G06F 11/20* (2006.01)
*G06F 3/06* (2006.01)

(56) References Cited

U.S. PATENT DOCUMENTS

2009/0327801 A1    12/2009  Maeda et al.
2011/0208996 A1*   8/2011   Hafner .................... G06F 9/466
                                                    714/6.24

* cited by examiner

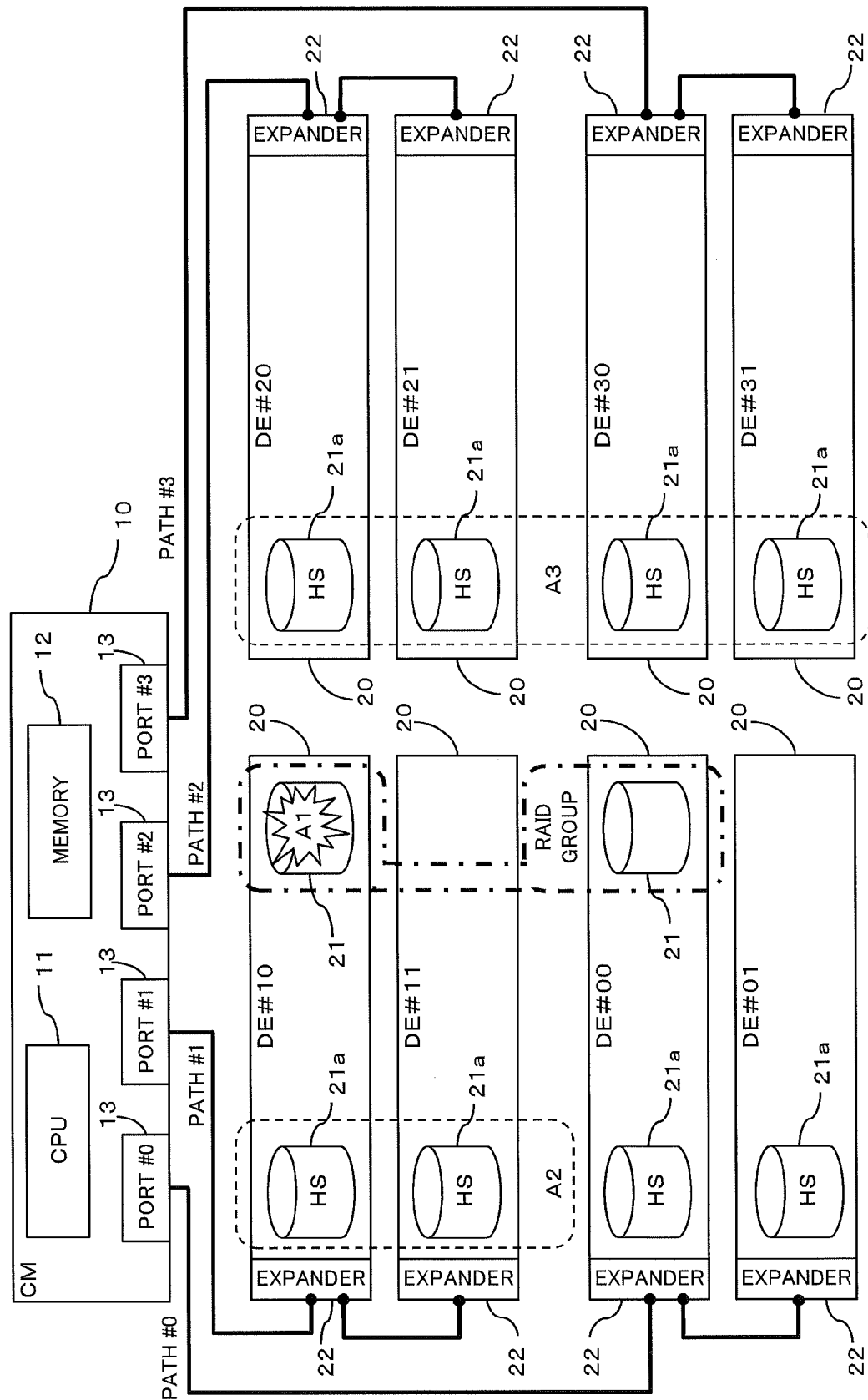

FIG. 3

| STORAGE DEVICE #0 |
|---|
| PLU NUMBER |
| DE NUMBER |
| INTER-DE SLOT NUMBER |
| HS or Data |
| iops |
| MB/s |
| ROTATION NUMBER |
| CAPACITY |
| inch |
| HDD or SSD |
| DE PATH |
| RLU NUMBER |

| STORAGE DEVICE #1 |
|---|
| PLU NUMBER |
| DE NUMBER |
| INTER-DE SLOT NUMBER |
| HS or Data |
| iops |
| MB/s |
| ROTATION NUMBER |
| CAPACITY |
| inch |
| HDD or SSD |
| DE PATH |
| RLU NUMBER |

⋮

| STORAGE DEVICE #n |
|---|
| PLU NUMBER |
| DE NUMBER |
| INTER-DE SLOT NUMBER |
| HS or Data |
| iops |
| MB/s |
| ROTATION NUMBER |
| CAPACITY |
| inch |
| HDD or SSD |
| DE PATH |
| RLU NUMBER |

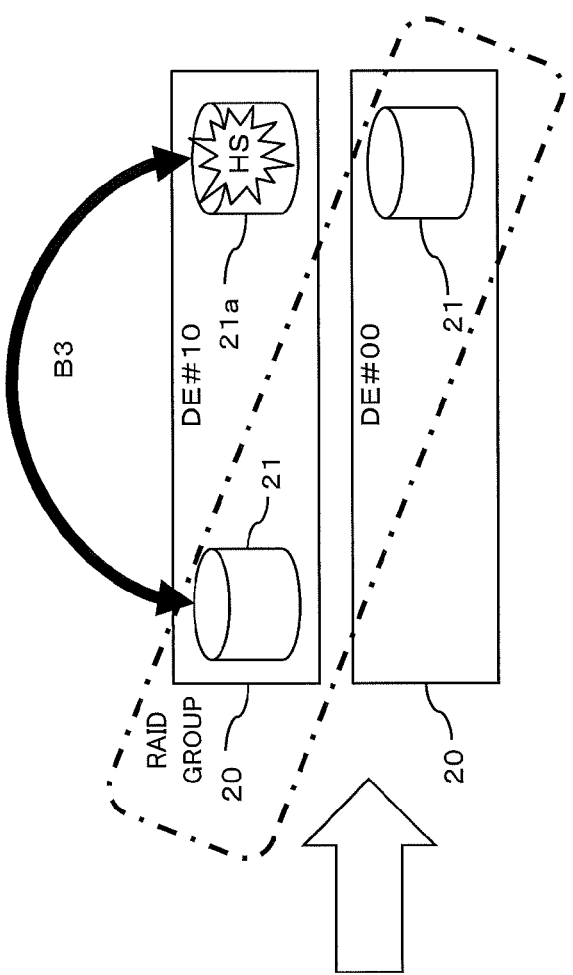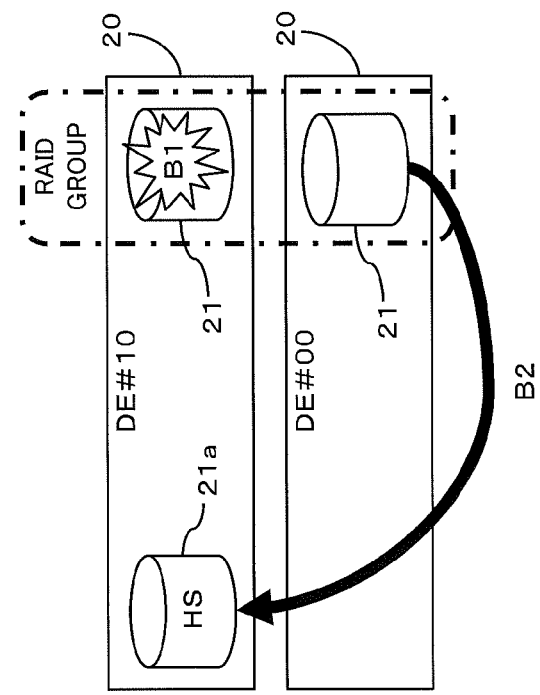
FIG. 4B
FIG. 4A

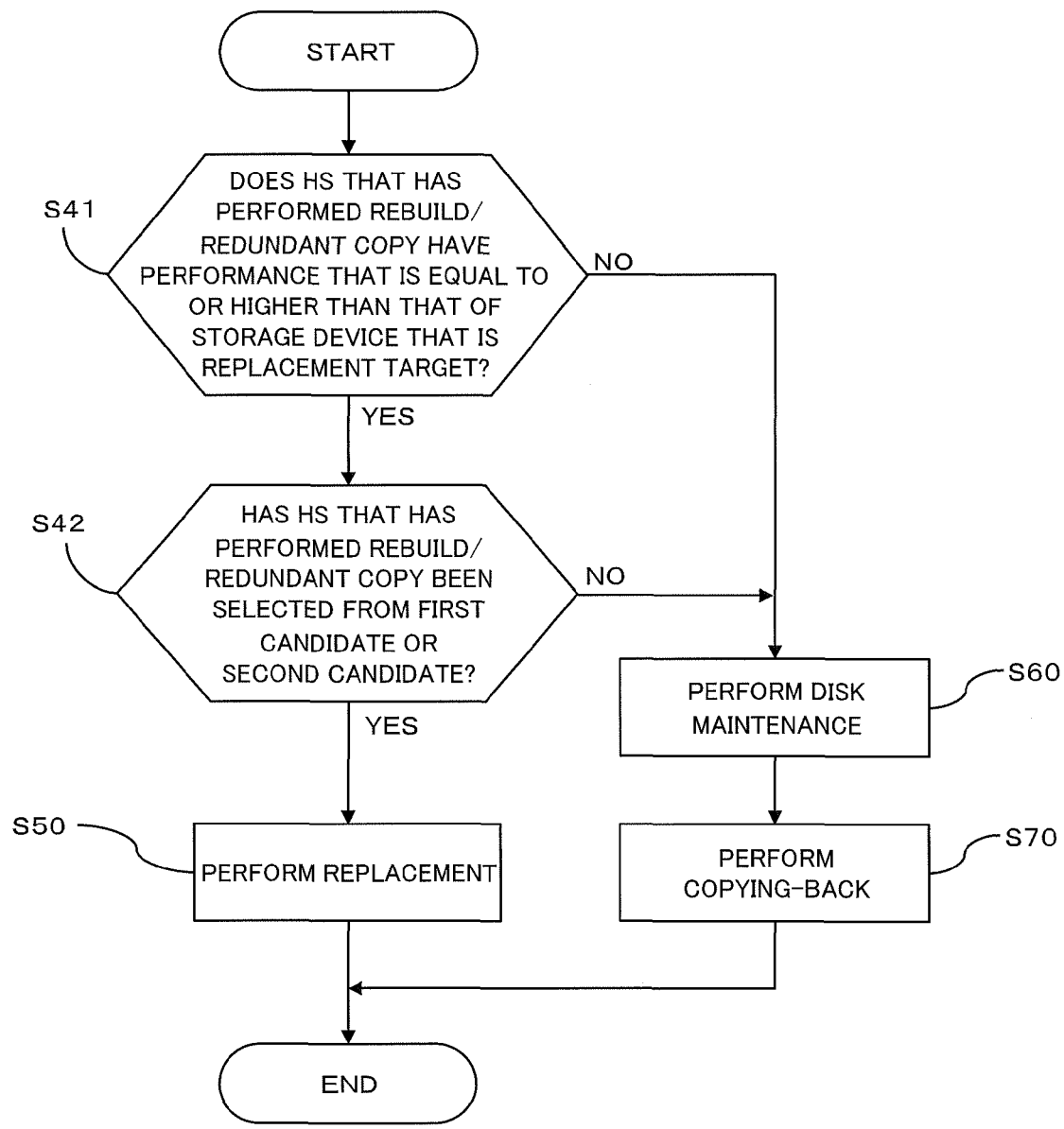

STORAGE CONTROL DEVICE, NON-TRANSITORY COMPUTER-READABLE RECORDING MEDIUM HAVING STORED THEREIN PROGRAM, AND CONTROL METHOD

CROSS-REFERENCE TO RELATED APPLICATION

This application is based upon and claims the benefit of priority of the prior Japanese Patent application No. 2013-239897, filed on Nov. 20, 2013, the entire contents of which are incorporated herein by reference.

FIELD

The embodiment discussed herein is directed to a storage control device, a program, and a control method.

BACKGROUND

In a storage apparatus, in a case where a storage device is broken down or preventive maintenance of a storage device is performed, data is copied (rebuilding/redundant copying) to a hot spare (HS; spare storage device). Then, after rebuilding/redundant copying is completed, and the broken storage device or a storage device that is the target for the preventive maintenance is replaced, a copying-back operation from the HS to a storage device after the replacement is performed.

The operation of a conventional storage apparatus is dedicatedly used for a host, and there is a premise that a change in the configuration is hardly made and, also in the copying-back operation, as is known, the operation configures a part of the maintenance sequence.

[Patent Literature 1] Japanese Laid-open Patent Publication No. 7-110743

[Patent Literature 2] Japanese Laid-open Patent Publication No. 2010-9442

However, when the copying-back operation from the HS is performed, for example, the storage apparatus needs to be monitored until the copying-back operation is completed, and there is an influence on the input/output (I/O) performance during the copying-back operation. In other words, implementation of an open system or shared use (clouding or the like) of a system including a storage apparatus has progressed, and there is an issue for reducing the load according to the operation work (copying-back operation) in an operation form.

SUMMARY

There is provided a storage control device that is communicably connected to a plurality of storage devices and a plurality of spare storage devices through a plurality of paths. The storage control device includes: a memory configured to store path information associating the plurality of spare storage devices and the plurality of paths with each other; and a selection unit configured to select a spare storage device that is a replacing apparatus from among the plurality of spare storage devices based on a path connection condition determined in accordance with a path in which the storage device that is a replacement target among the plurality of storage devices is connected and the path information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram that illustrates an HS selecting process performed by a selection unit of the storage apparatus as an example of the embodiment;

FIG. 3 is a diagram that illustrates the storage device performance information of the storage apparatus as an example of the embodiment;

FIG. 4A is a diagram that illustrates a write process performed by a write processing unit of the storage apparatus as an example of the embodiment;

FIG. 4B is a diagram that illustrates a storage device replacing process performed by a replacement processing unit of the storage apparatus as an example of the embodiment;

FIG. 10 is a flowchart that illustrates a storage device replacement determining process of the storage apparatus as an example of the embodiment.

DESCRIPTION OF EMBODIMENTS

Figure 1:
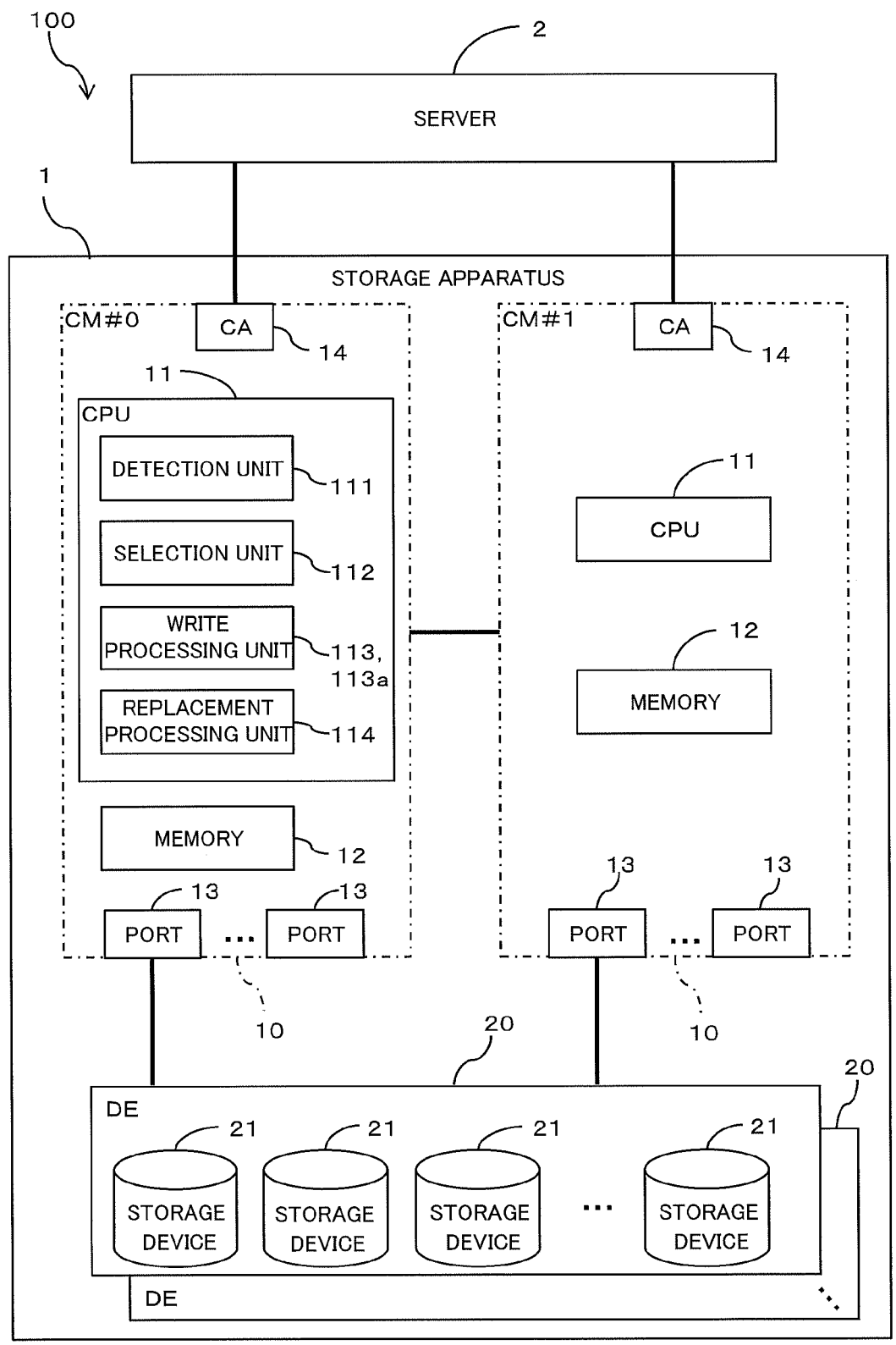
FIG. 1 is a schematic diagram that illustrates the functional configuration of a storage system as an example of an embodiment.

Hereinafter, a storage control device, a program, and a control method according to an embodiment will be described with reference to the drawings. However, the embodiment illustrated below is merely an example but is not intended to exclude various modified examples or the application of various technologies that are not explicitly represented in the embodiment. In other words, this embodiment may be variously changed in a range not departing from the concept thereof.

In addition, each diagram is not intended to include only constituent elements illustrated in the diagram, but any other function and the like may be included.

Like reference numerals in the drawings denote like elements, and thus their description will not be presented.

[A] Example of Embodiment

[A-1] System Configuration

FIG. 1 is a schematic diagram that illustrates the functional configuration of a storage system as an example of an embodiment.

The storage system 100 according to an example of the embodiment, as illustrated in FIG. 1, includes a storage apparatus (storage disk array apparatus) 1 and a server 2. The storage apparatus 1 and the server 2, as illustrated in the figure, are communicably interconnected, for example, through a local area network (LAN) cable.

The server 2, for example, is a computer (information processing apparatus) provided with a server function. In the example illustrated in FIG. 1, while one server 2 is provided, two or more servers 2 may be provided.

The storage apparatus 1 is equipped with a plurality of storage devices 21 to be described later and provides a storage area for the server 2. The storage apparatus 1 distributes data to the plurality of storage devices 21 using redundant arrays of inexpensive disks (RAID) and stores the data in a redundant state. The storage apparatus 1 includes two control modules #0 and #1 (CM #0 and CM #1; storage control devices) 10 and a plurality of disk enclosures (DE) 20.

Hereinafter, in a case where a specific CM is represented, it will be simply denoted as "CM #0" or "CM #1". On the other hand, in a case where an arbitrary CM is represented, it will be denoted as a "CM 10".

As illustrated in FIG. 1, CM #0 and CM #1 are communicably interconnected, for example, through a peripheral component interconnect express (PCIe) bus, and the CM 10 and the DE 20 are communicably interconnected, for example, through a bus line (access path).

For redundancy, each DE 20 is connected to CM #0 and CM #1 to be communicable with each other through access paths and includes a plurality of storage devices 21.

Each storage device 21 is a known device that stores data to be readable and writable and, for example, is a hard disk drive (HDD) or a solid state drive (SSD). The storage devices 21 have the same configuration. Among the plurality of the storage devices 21 included in each DE 20, at least one, as illustrated in FIG. 2, serves as an HS 21a.

The CM 10 is a control device that performs various control processes and performs various control processes in accordance with storage access requests (access control signals; hereinafter, referred to as host I/Os) from the server 2. The CM 10 includes a central processing unit (CPU) 11, a memory 12, a plurality of ports 13, and a communication adapter (CA) 14. In the example illustrated in FIG. 1, while the storage apparatus 1 is illustrated to include two CMs 10, the number of CMs 10 is not limited thereto, and thus one or three or more CMs 10 may be included therein.

The CA 14 is an interface controller that connects to the server 2 in a communicable manner.

The port 13 is a device adapter (DA) as an interface used for connecting the CM 10 and the DE 20 together in a communicable manner and, for example, is a fiber channel (FC) adapter. The CM 10 writes/reads data into/from the DE 20 through the port 13.

The memory 12 is a storage device that includes a read only memory (ROM) and a random access memory (RAM). In the ROM of the memory 12, programs such as a basic input/output system (BIOS) and the like have been written. A software program on the memory 12 is appropriately read and executed by the CPU 11. In addition, the RAM of the memory 12 is used as a primary recording memory or a working memory. In an example of this embodiment, the memory 12 stores information relating to a path connection condition (to be described later with reference to FIG. 2), path information (to be described later with reference to FIG. 3), RAID configuration information (to be described later with reference to FIG. 3), and storage device performance information (to be described later with reference to FIG. 3). Alternatively, the information relating to the path connection condition, the path information, the RAID configuration information, and the storage device performance information may be stored in a storage device, which is not illustrated in the figure, included in the CM 10.

The CPU 11 is a processing device that performs various control processes and various calculation operations and realizes various functions by executing an operating system (OS) or a program stored in the memory 12. In other words, the CPU 11, as illustrated in FIG. 1, serves as a detection unit 111, a selection unit 112, a write processing unit 113, and a replacement processing unit 114.

The program for realizing the functions of the detection unit 111, the selection unit 112, the write processing unit 113, and the replacement processing unit 114, for example, is provided in a form being recorded on a computer-readable recording medium such as a flexible disk, a CD (a CD-ROM, a CD-R, a CD-RW, or the like), a DVD (a DVD-ROM, a DVD-RAM, a DVD-R, a DVD+R, a DVD-RW, a DVD+RW, an HD DVD, or the like), a Blu-ray disk, a magnetic disk, an optical disc, or a magneto-optical disk. A computer reads the program from the recording medium through a reading device not illustrated in the figure, transfers the read program to an internal recording device or an external recording device so as to be stored therein, and uses the stored program. In addition, the program may be recorded in a storage device (recording medium) such as a magnetic disk, an optical disc, or a magneto-optical disk and supplied from the storage device to the computer through a communication path.

In order to realize the functions of the detection unit 111, the selection unit 112, the write processing unit 113, and the replacement processing unit 114, the program stored in the internal storage device (in this embodiment, the memory 12) is executed by a microprocessor (in this embodiment, the CPU 11) of the computer. At this time, the program recorded on the recording medium may be read and executed by the computer.

In addition, the storage apparatus 1 may be configured to be redundant by configuring CM #0 as primary and CM #1 as secondary. Furthermore, in a case where CM #0 that is the primary module is broken down, CM #1 that is the secondary module may be configured to succeed the function of CM #0.

The detection unit 111 specifies a storage device 21 that is a replacement target. More specifically, the detection unit 111 detects the occurrence of an abnormality of the storage device 21 such as breakdown and detects the occurrence of a request for preventive maintenance of the storage device 21 from an operator, thereby specifying the storage device 21 that is the replacement target. In a case where the preventive maintenance of the storage device 21 is performed, the detection unit 111 may be configured to detect the elapse of a predetermined time after building the storage device 21 into the storage apparatus 1 or detect the occurrence of an error for a predetermined number of times or more in accordance with host I/Os for a specific storage device 21. In addition, the detection unit 111, as will be described later with reference to FIG. 7, detects a compatible HS that becomes usable during the execution of a write process for an incompatible HS.

The selection unit 112 selects an HS 21a that is the replacing apparatus from among a plurality of HS's 21a included in the storage apparatus 1. More specifically, in a case where a storage device 21 that is the replacement target is specified by the detection unit 111, the selection unit 112 selects an HS 21a that is the replacing apparatus in which data stored in the storage device 21 that is the replacement target is to be stored. A specific technique for selecting the HS 21a that is the replacing apparatus using the selection unit 112 will be described later with reference to FIG. 2.

Figure 6:
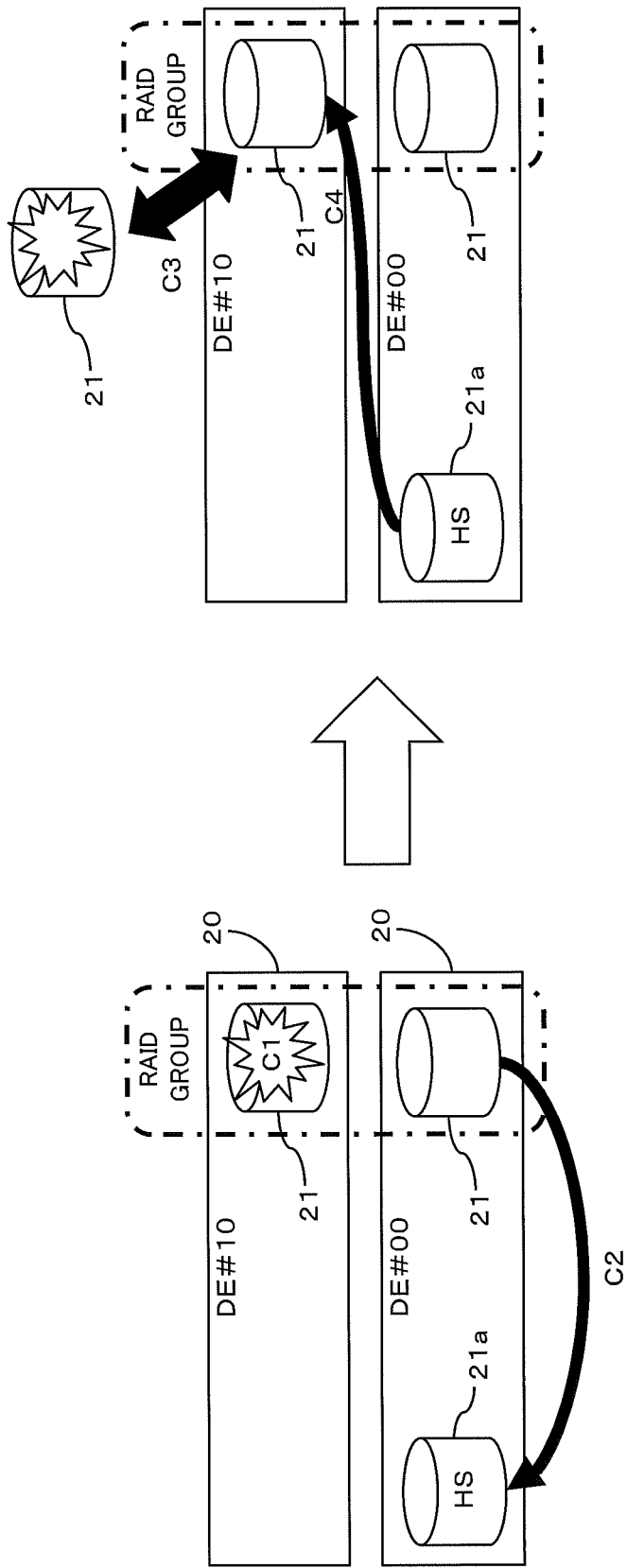
FIG. 6A is a diagram that illustrates a writing process performed by a write processing unit of the storage apparatus as an example of the embodiment.
FIG. 6B is a diagram that illustrates a writing-back process performed by a writing-back processing unit of the storage apparatus as an example of the embodiment.

The write processing unit 113 writes data into the storage device 21. More specifically, the write processing unit 113 performs a rebuilding/redundant copying (data disk building) process for the HS 21a that is the replacing apparatus selected by the selection unit 112. In a plurality of storage devices 21 configuring the same RAID group, the data of each storage device 21 is copied to a plurality of other storage devices 21 in a distributed manner so as to be redundant. The write processing unit 113 reads data stored in the plurality of storage devices 21 configuring the RAID group together with the storage device 21 that is the replacement target and stores the read data in the HS 21a that is the replacing apparatus, thereby restoring data (data disk building) of the storage device 21 that is the replacement target. In addition, after the replacement of the storage device 21 that is the replacement target, the write processing unit 113 serves also as a writing-back processing unit 113a that copies back (writes back) data written in the HS 21a that is the replacing apparatus to the storage device 21 after replacement. A specific writing technique using the write processing unit 113 will be described later with reference to FIGS. 4A, 4B, 6A, and 6B, and a specific writing-back technique using the writing-back processing unit 113a will be described later with reference to FIGS. 6A and 6B.

After the rebuilding/redundant copying using the write processing unit 113 is completed, the replacement processing unit 114 determines whether definitions (storage device configuration information to be described later with reference to FIG. 5) of the storage device 21 that is the replacement target and the HS 21a that is the replacing apparatus can be interchanged. In addition, the replacement processing unit 114 replaces the storage device 21 that is the replacement target using the HS 21a in which data has been written by the write processing unit 113. A specific replacement technique using the replacement processing unit 114 will be described later with reference to FIGS. 4A and 4B.

Hereinafter, the functions of the detection unit 111, the selection unit 112, the write processing unit 113, and the replacement processing unit 114 will be described in detail with reference to FIGS. 2 to 7.

FIG. 2 is a diagram that illustrates an HS selecting process performed by the selection unit of the storage apparatus as an example of the embodiment.

In the example illustrated in FIG. 2, the CM 10 is communicably connected to eight DEs 20 through four paths #0 to #3. In the example illustrated in FIGS. 2, #00, #01, #10, #11, #20, #21, #30, and #31 are represented to be assigned to the eight DEs 20.

Hereinafter, in a case where a specific DE is represented, it will be denoted as "DE #00", "DE #01", "DE #10", "DE #11", "DE #20", "DE #21", "DE #30", or "DE #31". On the other hand, in a case where an arbitrary DE is represented, it will be denoted as a "DE 20". In addition, hereinafter, DEs #00, #10, #20, and #30 that are directly connected to the CM 10 through paths #0 to #3 may be referred to as basic DEs 20. Hereinafter, DEs #01, #11, #21, and #31 that are indirectly connected (cascade connection) to the CM 10 respectively through DEs #00, #10, #20, and #30 may be referred to as extended DEs 20.

The CM 10 includes four ports 13 denoted as #0 to #3. Hereinafter, in a case where a specific port is represented, it will be denoted as one of "port #0" to "port #3", and, in a case where an arbitrary port is represented, it will be denoted as a "port 13". Ports #0 to #3 are respectively connected to paths #0 to #3.

The DE 20 includes a plurality of storage devices 21 each including one HS 21a and an expander 22. In the example illustrated in FIG. 2, some of the storage devices 21 are not illustrated for the simplification.

The expander 22 is a device that relays between the CM 10 and the DE 20 and performs a data transfer based on a host I/O. In other words, the CM 10 accesses each DE 20 through the expander 22. In the example illustrated in FIG. 2, the expander 22 of the basic DE 20 is connected to the CM 10 and the extended DE 20, and the expander 22 of the extended DE 20 is connected to the basic DE 20. Then, through this expander 22, a plurality of DEs 20 are connected in a cascaded manner (multi-stage connection).

The detection unit 111, for example, detects the occurrence of breakdown in the storage device 21 of DE #10 or detects the occurrence of a request for preventive maintenance of the storage device 21 of DE #10 (see reference sign A1). In other words, the detection unit 111 specifies the storage device denoted by reference sign A1 as the storage device 21 that is the replacement target.

In the example illustrated in FIG. 2, the storage device 21 that is the replacement target and the storage device 21 of DE #00 configure a RAID group.

The selection unit 112 selects an HS 21a that is the replacing apparatus used for replacing the storage device 21 that is the replacement target among the plurality of HS's 21a included in the storage apparatus 1.

More specifically, the selection unit 112 acquires a path in which the storage device that is the replacement target is connected and a path connection condition that is determined based on the acquired path from the memory 12. In addition, the selection unit 112 acquires path information (to be described later with reference to FIG. 3) representing paths of a plurality of HS's 21a included in the storage apparatus 1 and RAID configuration information (to be described later with reference to FIG. 3) representing the RAID configuration from the memory 12.

Then, the selection unit 112 selects an HS 21a having highest redundancy from the viewpoint of the path connection in the RAID configuration of the storage apparatus 1 as the HS 21a that is the replacing apparatus.

The selection unit 112 selects HS's 21a on the same path as the path in which the storage device 21 that is the replacement target is connected from among the plurality of HS's 21a as first candidates for the HS 21a that is the replacing apparatus. Here, the same path represents paths that are connected to the same port 13. In other words, in the example illustrated in FIG. 2, for the storage device 21 that is the replacement target, the selection unit 112 selects HS's 21a of DEs #10 and #11 connected to the CM 10 through path #1 as first candidate HS's 21a (see reference sign A2). In addition, in a case where there are a plurality of first candidate HS's 21a (for example, HS's 21a of DEs #10 and #11), the selection unit 112 selects the HS 21a of the basic DE 20 (for example, DE #10) that has a smallest number of stages of the cascade connection so as to be close to the CM 10 as the first candidate with high priority.

In addition, the selection unit 112 selects an HS 21a that is present on a path in which the storage device 21 that is the replacement target is not connected and is present on a path that does not configure a RAID group together with the storage device 21 that is the replacement target among the plurality of HS's 21a as a second candidate for the HS 21a that is the replacing apparatus. In other words, the selection unit 112 selects the HS's 21a of DEs #20, #21, #30, and #31 connected to the CM 10 through paths #2 and #3 as second candidate HS's 21a (see reference sign A3). In addition, in a case where there are a plurality of second candidate HS's 21a (for example, the HS's 21a of DEs #20, #21, #30, and #31), the selection unit 112 selects the HS's 21a of the DEs 20 (for example DEs #20 and #21) having a smallest path number as the second candidates with high priority. Furthermore, in a case where there are a plurality of DEs 20 (for example, DEs #20 and #21) on the path having the smallest path number, the selection unit 112 selects the HS 21a of the basic DE 20 (for example, DE #20) that has the smallest number of stages of the cascade connection so as to be closest to the CM 10 as the second candidate with high priority.

In other words, based on the path in which the storage device 21 that is the replacement target is connected, the selection unit 112 selects an HS 21a satisfying the path connection condition from among the plurality of HS's 21a as the HS 21a that is the replacing apparatus. Here, the path connection condition, for example, is a condition that is determined based on the path in which the storage device 21 that is the replacement target is connected. Then, the selection unit 112 selects the first or second candidate HS 21a as the HS 21a that is the replacing apparatus by using the path connection condition.

Furthermore, the selection unit 112 selects, as the HS 21a that is the replacing apparatus, an HS 21a satisfying a performance condition with high priority with reference to the storage device 21 that is the replacement target from among a plurality of HS's 21a. In other words, the selection unit 112 determines whether or not the first candidate HS 21a satisfies the performance condition. Then, in a case where the first candidate HS 21a satisfies the performance condition, the selection unit 112 selects the first candidate HS 21a. On the other hand, in a case where the first candidate HS 21a does not satisfy the performance condition, the selection unit 112 determines whether the second candidate HS 21a satisfies the performance condition. In a case where the second candidate HS 21a satisfies the performance condition, the selection unit 112 selects the second candidate HS 21a. On the other hand, in a case where the second candidate HS 21a does not satisfy the performance condition, the selection unit 112 selects the HS 21a of the DE 20 having the smallest value of the path number with high priority. In addition, in a case where there are a plurality of DEs 20 (for example DEs #00 and #01) on the path having the smallest path number, the selection unit 112 selects a basic DE 20 (for example, DE #00) that has the smallest number of stages of the cascade connection so as to be closest to the CM 10 with high priority.

FIG. 3 is a diagram that illustrates the storage device performance information of the storage apparatus as an example of the embodiment.

In the storage device performance information, for each storage device 21, for example, a physical logical unit (PLU) number, a DE number, an inter-DE slot number, a distinction between an HS and a data storage device (HS or Data), iops, access speed (MB/s), a revolution number, a capacity, a disk size (inch), a distinction between an HDD and an SSD (HDD or SSD), a DE path, and a RAID logical unit (RLU) number are associated with one another. The storage device performance information, for example, is stored in the memory 12.

The PLU number, for example, includes an expander port number, a DE cascade number, and an inter-DE slot number and is information of 16 bits. For example, an inter-DE slot number is registered in bits 1 to 4, a DE cascade number is registered in bits 8 to 11, and an expander port number is registered in bits 12 to 13. In the expander port number, information relating to a path in which the storage device 21 (DE 20) is connected is registered, and, for example, information corresponding to paths #0 to #3 illustrated in FIG. 2 is registered. In the DE cascade number, the connection sequence of the DE 20 is registered.

The DE path is information that is generated based on the expander port number and, for example, information corresponding to paths #0 to #3 illustrated in FIG. 2 is registered therein.

The RLU number is information that represents the number of a RAID group to which the storage device 21 belongs. In a case where the storage device 21 belongs to any one RAID group, the number of the corresponding RAID group is registered in the RLU number. On the other hand, in a case where the storage device 21 (HS 21a) is unused, a number (0xFFFF or the like) that is not used as the number of a RAID group is registered in the RLU number.

In an example of this embodiment, the DE path and the RLU number included in the storage device performance information are respectively defined as the path information and the RAID configuration information.

Then, the selection unit 112 selects an HS 21a that is the replacing apparatus from among a plurality of HS's 21a based on the path connection condition and the path information determined in accordance with the path in which the storage device 21 that is the replacement target among the plurality of storage devices 21 is connected. More specifically, the selection unit 112 selects an HS 21a on the same path as the path in which the storage device 21 that is the replacement target among the plurality of HS's 21a is connected as the first candidate for the HS 21a that is the replacing apparatus based on the path connection condition and the path information. In addition, based on the path connection condition and the path information, the selection unit 112 selects an HS 21a that is on a path in which the storage device 21 that is the replacement target is not connected and is on a path not configuring the RAID group together with the storage device 21 that is the replacement target from among the plurality of HS's 21a as a second candidate for the HS 21a that is the replacing apparatus.

The selection unit 112 determines the performance condition, for example, based on the storage device performance information stored in the memory 12 included in the CM 10.

The selection unit 112 determines whether the performance condition is satisfied by determining whether or not at least some indices included in the storage device performance information of the HS 21a that is the replacing apparatus are equal to or more than corresponding indices of the storage device 21 that is the replacement target. Here, the some indices used for determining the performance condition may be variously selected from among the storage device performance information. In addition, the determination on whether the index (performance value) of the storage device performance information is equal to or more than the corresponding index is performed based on whether the performance value is a threshold or more. The threshold value is set based on the performance value of the storage device 21 that is the replacement target. In order to allow the performance value of the storage device 21 that is the replacement target to have desirable flexibility, a margin of a predetermined amount (for example, 5%) may be included in the threshold value.

Hereinafter, an HS 21*a* that is selected from the first candidate or the second candidate and satisfies the performance condition will be referred to as a compatible HS. In addition, hereinafter, an HS 21*a* that is selected from HS's other than the first and second candidates or does not satisfy the performance condition will be referred to as an incompatible HS. In other words, an HS 21*a* satisfying the path connection condition and the performance condition will be referred to as compatible HS, and an HS 21*a* that does not satisfy the path connection condition or the performance condition will be referred to as an incompatible HS.

FIG. 4A is a diagram that illustrates a write process performed by the write processing unit of the storage apparatus as an example of the embodiment. FIG. 4B is a diagram that illustrates an example of a storage device replacing process performed by the replacement processing unit.

In the example illustrated in FIGS. 4A and 4B, only DEs #00 and #10 are illustrated among the plurality of DEs 20 illustrated in FIG. 2 for the simplification, and some storage devices 21 and some HS's 21*a* included in DEs #00 and #10 are not illustrated.

In the example illustrated in FIG. 4A, the HS 21*a* of DE #10 is the HS 21*a*, which is the replacing apparatus, selected by the selection unit 112 and is a compatible HS.

The write processing unit 113 writes data stored in the storage device 21 that is the replacement target into the HS 21*a* that is the replacing apparatus based on redundant data stored in the storage device 21 of DE #00 configuring a RAID group together with the storage device 21 (see reference sign B1 illustrated in FIG. 4A) that is the replacement target (see reference sign B2 illustrated in FIG. 4A). More specifically, for example, in a case where the occurrence of an abnormality such as breakdown is detected in the storage device 21 of DE #10, the write processing unit 113 rebuilds data stored in the storage device 21 that is the replacement target in the HS 21*a* that is the replacing apparatus based on the data stored in the storage device 21 of DE #00. In addition, in a case where a request for preventive maintenance of the storage device 21 that is the replacement target is detected, the write processing unit 113 redundantly copies data stored in the storage device 21 that is the replacement target into the HS 21*a* that is the replacing apparatus based on the data stored in the storage device 21 of DE #00.

The replacement processing unit 114 determines whether or not the HS 21*a* that is the replacing apparatus has been selected from the first candidate or the second candidate and satisfies the performance condition. In other words, the replacement processing unit 114 determines whether or not the HS 21*a* that is the replacing apparatus is a compatible HS.

In the example illustrated in FIG. 4A, since the HS 21*a* that is the replacing apparatus is a compatible HS, the replacement processing unit 114 replaces the storage device 21 that is the replacement target with the HS 21*a* in which the data has been written by the write processing unit 113 (see reference sign B3 illustrated in FIG. 4B). In other words, the replacement processing unit 114 changes the HS 21*a* that is the replacing apparatus as an operating storage device 21 and changes the storage device 21 that is the replacement target as an HS 21*a*. In addition, the storage device 21 of DE #10 that has been changed from the HS 21*a* to the operating storage device is defined to be in the same RAID group as that of the storage device 21 of DE #00.

In other words, in a case where the HS 21*a* that is the replacing apparatus satisfies the path connection condition and the performance condition, after the completion of the rebuilding/redundant copying, the operator's disk maintenance or copying-back using the writing-back processing unit 113*a* is not performed. Then, the replacement processing unit 114 builds the HS 21*a* that is the replacing apparatus as a data disk configuring the RAID and defines the storage device 21, which is the replacement target, that is a data disk as an HS 21*a* (the HS 21*a* and the data disk are interchanged).

In addition, the operator may be notified of the completion of the rebuilding/redundant copying or the storage device replacing process, for example, by a display device, which is not illustrated in the figure, included in the server 2.

Figure 5:
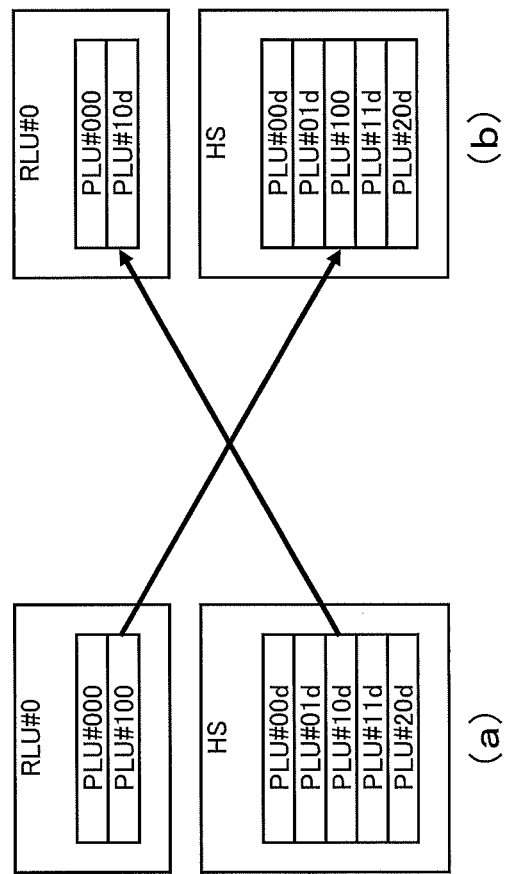
FIG. 5 is a diagram that illustrates storage device configuration information before and after change in the storage apparatus as an example of the embodiment.

FIG. 5 is a diagram that illustrates the storage device configuration information before and after change in the storage apparatus as an example of the embodiment.

The replacement processing unit 114 rewrites the storage device configuration information stored in a storage device, which is not illustrated in the figure, included in the CM 10, thereby replacing the storage device 21 that is the replacement target with the HS 21*a* in which the data has been written by the write processing unit 113.

In the example illustrated in reference symbol (a) of FIG. 5, in the storage device configuration information, PLU #000 and PLU #100 are defined as RLU #0, and PLU #00*d*, PLU #01*d*, PLU #10*d*, PLU #11*d*, and PLU #20*d* are defined as HS's. PLU #000 and PLU #100 having the same RLU are defined to be in the same RAID group. For example, PLU #000, PLU #100, and PLU #10*d* illustrated in FIG. 5 respectively correspond to the storage device 21 of DE #00, the storage device 21 that is the replacement target, and the HS 21*a* of DE #10 illustrated in FIG. 4A.

When the storage device replacing process illustrated in FIG. 4B is performed, as illustrated in reference symbol (b) of FIG. 5, the replacement processing unit 114 interchanges PLU #100 of RLU #0 and PLU #10*d* of the HS with each other. In other words, PLU #000 and PLU #10*d* are defined to be in the same RAID group, and PLU #100 is defined as the HS 21*a*.

FIG. 6A is a diagram that illustrates an example of a write process performed by the write processing unit of the storage apparatus as an example of the embodiment, and FIG. 6B is a diagram that illustrates a writing-back process performed by the writing-back processing unit.

In the example illustrated in FIGS. 6A and 6B, only DEs #00 and #10 among the plurality of DEs 20 illustrated in FIG. 2 are illustrated, and some storage devices 21 and some HS's 21*a* included in DE's #00 and #10 are not illustrated for the simplification.

In the example illustrated in FIG. 6A, the HS 21*a* of DE #00 is an HS 21*a* that is the replacing apparatus selected by the selection unit 112 and is an incompatible HS.

The write processing unit 113 writes the data stored in the storage device 21 that is the replacement target into the HS 21*a* that is the replacing apparatus based on data stored in the storage device 21 of DE #00 configuring a RAID group together with the storage device 21 (see reference sign C1 illustrated in FIG. 6A) of DE #10 that is the replacement target (see reference sign C2 illustrated in FIG. 6A). More specifically, in a case where an abnormality such as breakdown is detected in the storage device 21 that is the replacement target, the write processing unit 113 rebuilds data stored in the storage device 21 that is the replacement target into the HS 21*a* that is the replacing apparatus based on the data stored in the storage device 21 of DE #00 for reproduction. In addition, in a case where a request for the preventive maintenance of the storage device 21 that is the replacement target is detected, the write processing unit 113 redundantly copies the data stored in the storage device 21 that is the replacement target into the HS 21a that is the replacing apparatus based on the data stored in the storage device 21 of DE #00.

The replacement processing unit 114 determines whether or not the HS 21a that is the replacing apparatus has been selected from the first candidate or the second candidate and satisfies the performance condition. In other words, the replacement processing unit 114 determines whether or not the HS 21a that is the replacing apparatus is a compatible HS.

In the example illustrated in FIGS. 6A and 6B, since the HS 21a that is the replacing apparatus is an incompatible HS, the operator, after the completion of the rebuilding/redundant copying performed by the write processing unit 113, replaces the storage device 21 that is the replacement target with a new storage device 21 (disk maintenance) (see reference sign C3 illustrated in FIG. 6B).

The writing-back processing unit 113a copies back (writes back) the data written into the HS 21a that is the replacing apparatus by the write processing unit 113 into the storage device 21 after the replacement (see reference sign C4 illustrated in FIG. 6B).

In addition, the operator may be notified of the completion of the rebuilding/redundant copying or the copying back, for example, by using a display device, which is not illustrated in the figure, included in the server 2.

Figure 7:
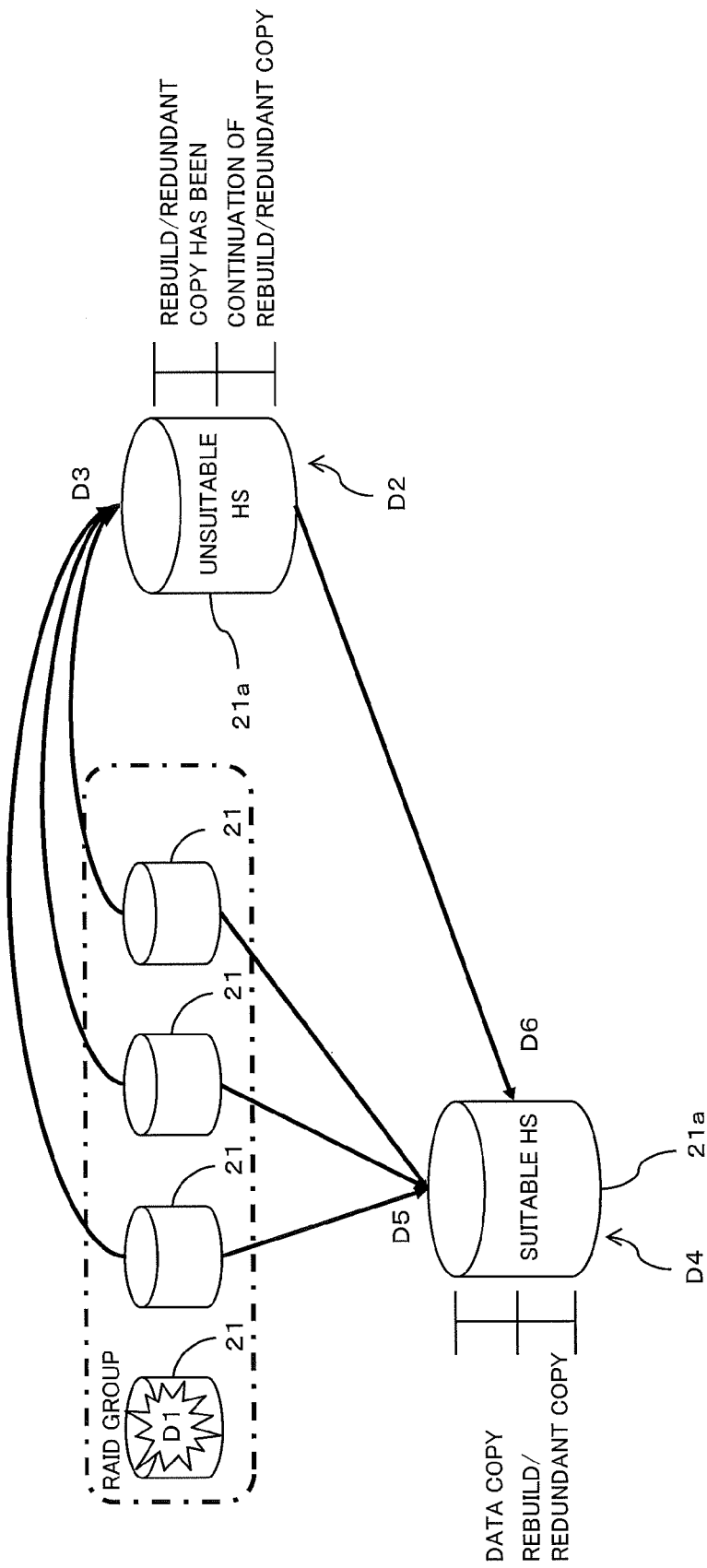
FIG. 7 is a diagram that illustrates a compatible HS interrupt process of the storage apparatus as an example of the embodiment.

FIG. 7 is a diagram that illustrates a compatible HS interrupt process of the storage apparatus as an example of the embodiment.

In the example illustrated in FIG. 7, the detection unit 111 specifies one storage device 21 among four storage devices 21 configuring a RAID group as a storage device 21 that is the replacement target (see reference sign D1).

The selection unit 112 selects an incompatible HS as the HS 21a that is a replacing apparatus (see reference sign D2).

The write processing unit 113 extracts redundant data of the storage device 21, which is the replacement target, that is stored in three storage devices 21, which configures a RAID group, other than the storage device 21 that is the replacement target and rebuilds/redundantly copies data stored in the storage device 21 that is the replacement target (see reference sign D3).

Here, for example, in a case where an HS 21a is released from another rebuilding/redundant copying process or a new HS 21a is installed inside the storage apparatus 1, the HS 21a that is newly usable is generated. In such a case, the detection unit 111 detects the newly-usable HS 21a.

Then, the selection unit 112 determines whether or not the HS 21a detected by the detection unit 111 is a compatible HS. In a case where the detected HS 21a is a compatible HS, the selection unit 112 selects the detected HS 21a as an HS 21a that is a new replacing apparatus (see reference sign D4).

The write processing unit 113 continues the rebuilding/redundant copying to the incompatible HS based on the data stored in three storage devices 21, which configure a RAID group, other than the storage device 21 that is the replacement target and performs rebuilding/redundant copying also for a compatible HS in a parallel manner (see reference sign D5). In other words, the write processing unit 113 starts rebuilding/redundant copying from an area (in the middle of the process) for which the rebuilding/redundant copying to the incompatible HS has not been completed to the compatible HS.

In addition, the write processing unit 113 copies data, of which the rebuilding/redundant copying to the incompatible HS has been completed, from the incompatible HS to a compatible HS in parallel with the rebuilding/redundant copying (see reference sign D6).

Then, after the completion of the copying of the data from the incompatible HS to the compatible HS, the replacement processing unit 114 performs a process of replacing the storage device 21 that is the replacement target with the compatible HS (see FIG. 4B). In other words, when the copying of data of which the rebuilding/redundant copying to the incompatible HS has been completed and is not stored in the compatible HS is completed, the replacement processing unit 114 performs a storage device replacing process between the storage device 21 that is the replacement target and the compatible HS.

In addition, the incompatible HS is released from the RAID group illustrated in FIG. 7 at a time point when the copying of data from the incompatible HS to the compatible HS is completed. Furthermore, at a time point when the copying of data from the incompatible HS to the compatible HS is completed, the write processing unit 113 stops the rebuilding/redundant copying to the incompatible HS even in the middle of execution of the rebuilding/redundant copying and continues only the rebuilding/redundant copying to the compatible HS.

[A-2] Operation

Figure 8:
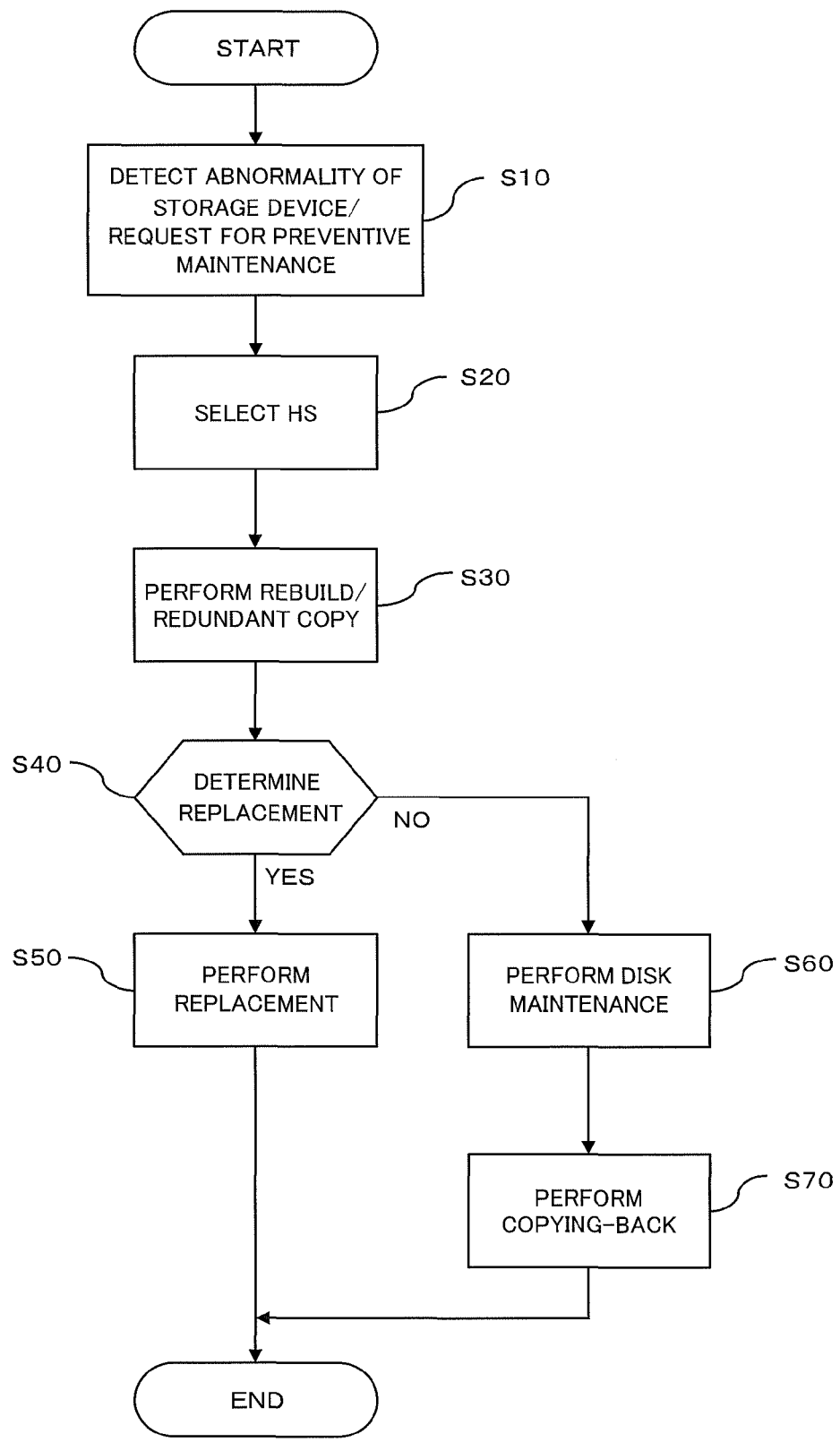
FIG. 8 is a flowchart that illustrates a storage device replacing process of the storage apparatus as an example of the embodiment.

The storage device replacing process performed in the storage apparatus as an example of the embodiment configured as described above will be described along a flowchart (Steps S10 to S70) illustrated in FIG. 8.

The detection unit 111 detects an abnormality of the storage device 21 such as breakdown or detects a request for the preventive maintenance of the storage device 21 from the operator or the like in Step S10. The detection of the request for the preventive maintenance of the storage device 21 may be performed by detecting the elapse of a predetermined time after building of the storage device 21 in the storage apparatus 1 using the detection unit 111. In addition, the detection of a request for the preventive maintenance of the storage device 21 may be performed by detecting the occurrence of an error for a predetermined number of times or more in accordance with the host I/Os for a specific storage device 21 using the detection unit 111.

The selection unit 112 selects an HS 21a that is the replacing apparatus from among a plurality of HS's 21a included in the storage apparatus 1 in Step S20. The HS selecting process will be described later in detail with reference to a flowchart illustrated in FIG. 9.

The write processing unit 113 performs a rebuilding/redundant copy process for the HS 21a, which is the replacing apparatus, selected by the selection unit 112 in Step S30. More specifically, the write processing unit 113 performs rebuilding in a case where an abnormality of the storage device 21 such as breakdown is detected by the detection unit 111 and performs redundant copy in a case where a request for the preventive maintenance of the storage device 21 is detected by the detection unit 111. In addition, in a data building process, the write processing unit 113 writes data stored in the storage device 21 that is the replacement target into the HS 21a that is the replacing apparatus based on data stored in the storage devices 21 configuring a RAID group together with the storage device 21 that is the replacement target.

The replacement processing unit 114 performs a replacement determination of the storage device 21 in Step S40. The replacement determination will be described later in detail with reference to a flowchart illustrated in FIG. 10.

In a case where the replacement of the storage device 21 can be performed as a result of the replacement determination (see Yes route of Step S40), the replacement processing unit 114 performs the replacement of the storage device 21 in Step S50, and the process ends. More specifically, the replacement processing unit 114 replaces the storage device 21 that is the replacement target with the HS 21a in which data has been written by the write processing unit 113. In other words, the replacement processing unit 114 performs the replacement process by interchanging the storage device configuration information of the storage device 21 that is the replacement target and the storage device configuration information of the HS 21a that is the replacing apparatus.

On the other hand, in a case where the replacement of the storage device 21 cannot be performed as a result of the replacement determination (see No route of Step S40), the operator performs disk maintenance in Step S60. More specifically, the operator replaces the storage device 21 that is the replacement target with a new storage device 21.

The writing-back processing unit 113a copies back (writes back) the data that has been written into the HS 21a that is the replacing apparatus by the write processing unit 113 into the storage device 21 after the replacement in Step S70, and the process ends.

Figure 9:
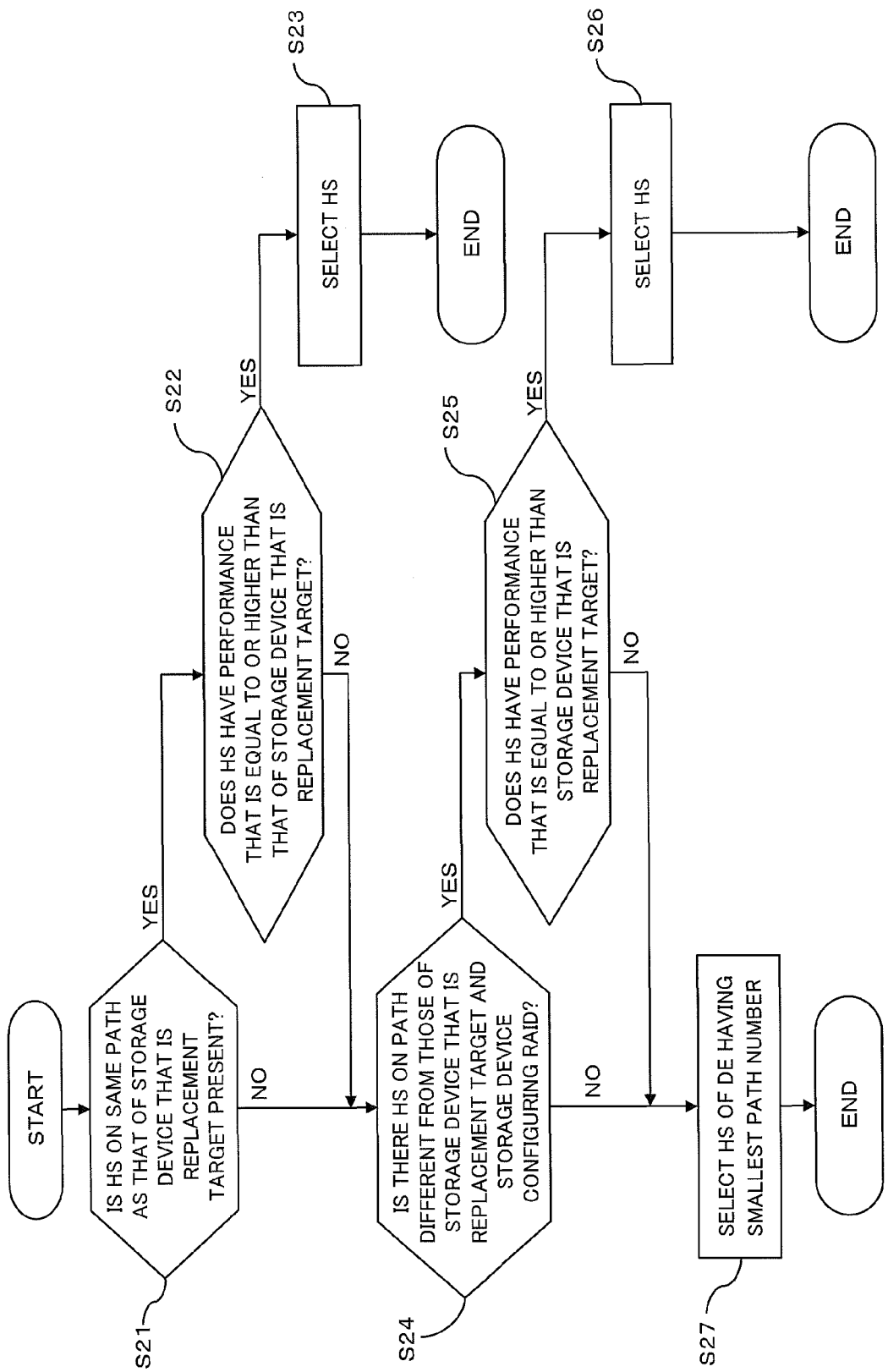
FIG. 9 is a flowchart that illustrates an HS selecting process of the storage apparatus as an example of the embodiment.

Next, the HS selecting process (Step S20) represented in a flowchart illustrated in FIG. 8 will be described in detail along a flowchart (Steps S21 to S27) illustrated in FIG. 9.

The selection unit 112 determines whether or not there is an HS 21a on the same path as that of the storage device 21 that is the replacement target in Step S21. In other words, the selection unit 112 determines whether or not the first candidate HS 21a is present inside the storage apparatus 1, and the first candidate HS 21a is usable.

In a case where the HS 21a on the same path as that of the storage device 21 that is the replacement target is present (see Yes route of Step S21), the selection unit 112 determines whether or not the HS 21a has performance that is equal to or higher than the storage device 21 that is the replacement target in Step S22. In other words, the selection unit 112 determines whether the HS 21a on the same path as that of the storage device 21 that is the replacement target satisfies the performance condition with reference to the storage device 21 that is the replacement target.

In a case where the HS 21a has the performance that is equal to or higher than the storage device 21 that is the replacement target (see Yes route of Step S22), the selection unit 112 selects the HS 21a as a compatible HS in Step S23. In this way, the process ends, and the process proceeds to Step S30 illustrated in FIG. 8. In other words, the selection unit 112 selects the HS 21a that is the first candidate HS 21a and satisfies the performance condition from among the plurality of HS's 21a as an HS 21a that is the replacing apparatus.

On the other hand, in a case where the HS 21a on the same path as that of the storage device 21 that is the replacement target does not have the performance that is equal to or higher than the storage device 21 that is the replacement target (see No route of Step S22), the process proceeds to Step S24.

In addition, in a case where there is no HS 21a on the same path as that of the storage device 21 that is the replacement target (see No route of Step S21), the process proceeds to Step S24.

Then, the selection unit 112 determines whether there is an HS 21a that is on a path in which the storage device 21 that is the replacement target is not connected and is on a path not configuring a RAID group together with the storage device 21 that is the replacement target in Step S24. In other words, the selection unit 112 determines whether the second candidate HS 21a is present inside the storage apparatus 1, and the second candidate HS 21a is usable.

In a case where there is an HS 21a that is on a path in which the storage device 21 that is the replacement target is not connected and is on a path not configuring a RAID group together with the storage device 21 that is the replacement target (see Yes route of Step S24), the selection unit 112 determines whether the HS 21a has performance that is equal to or higher than the storage device 21 that is the replacement target in Step S25. In other words, the selection unit 112 determines whether an HS 21a on a path different from the path of the storage device 21 configuring the RAID group together with the storage device 21 that is the replacement target satisfies the performance condition with reference to the storage device 21 that is the replacement target.

In a case where the HS 21a has the performance that is equal to or higher than the storage device 21 that is the replacement target (see Yes route of Step S25), the selection unit 112 selects the HS 21a as a compatible HS in Step S26. In this way, the process ends, and the process proceeds to Step S30 illustrated in FIG. 8. In other words, the selection unit 112 selects an HS 21a that is the second candidate HS 21a and satisfies the performance condition from among a plurality of HS's 21a as an HS 21a that is the replacing apparatus.

On the other hand, in a case where the HS 21a that is on a path in which the storage device 21 that is the replacement target is not connected and is on a path not configuring a RAID group together with the storage device 21 that is the replacement target does not have the performance that is equal to or higher than the storage device 21 that is the replacement target (see No route of Step S25), the process proceeds to Step S27.

In addition, also in a case where there is no HS 21a that is on a path in which the storage device 21 that is the replacement target is not connected and is on a path not configuring a RAID group together with the storage device 21 that is the replacement target (see No route of Step S24), the process proceeds to Step S27.

Then, the selection unit 112, for example, selects the HS 21a of a DE 20 having the smallest path number as an incompatible HS in Step S27. In this way, the process ends, and the process proceeds to Step S30 illustrated in FIG. 8.

Next, the storage device replacement determining process (Step S40) represented in a flowchart illustrated in FIG. 8 will be described in detail along a flowchart (Steps S41, S42, S50, S60, and S70) illustrated in FIG. 10.

The replacement processing unit 114 determines whether the HS 21a for which the rebuilding/redundant copying process has been performed by the write processing unit 113 has performance that is equal to or higher than the storage device 21 that is the replacement target in Step S41.

In a case where the HS 21a does not have the performance that is equal to or higher than the storage device 21 that is the replacement target (see No route of Step S41), as described above with reference to FIG. 8, the operator performs disk maintenance in Step S60. Then, the writing-back processing unit 113a performs copying-back in Step S70, and the process ends.

On the other hand, in a case where the HS 21a has the performance that is equal to or higher than the storage device 21 that is the replacement target (see Yes route of Step S41), the replacement processing unit 114 determines whether the HS 21a has been selected from the first candidate or the second candidate in Step S42.

In a case where the HS 21a has not been selected from the first candidate or the second candidate (see No route of Step S42), the process proceeds to Step S60.

On the other hand, in a case where the HS 21a has been selected from the first candidate or the second candidate (see Yes route of Step S42), as described above with reference to FIG. 8, the replacement processing unit 114 performs replacement of the storage device 21 in Step S50, and the process ends.

[A-3] Advantage

As above, according to the CM (storage control device) 10 of an example of this embodiment, the following advantages can be acquired.

The selection unit 112 selects an HS 21a that is the replacing apparatus from among a plurality of HS's 21a based on the path connection condition determined in accordance with the path in which the storage device 21 that is the replacement target among the plurality of storage devices 21 is connected and the path information that associates the plurality of HS's 21a and a plurality of paths with each other. In this way, the replacement of the storage device 21 can be efficiently performed.

More specifically, the selection unit 112 selects a first candidate HS 21a that is on the same path as the path in which the storage device 21 that is the replacement target is connected from among the plurality of HS's 21a as the HS 21a that is the replacing apparatus as the path connection condition. In this way, before and after the replacement of the storage device 21, the load and the redundancy of the path between the CM 10 and the DE 20 can be maintained, and the configuration of the RAID group within the storage apparatus 1 can be maintained.

In addition, the selection unit 112 selects a second candidate HS 21a that is on a path in which the storage device 21 that is the replacement target or a storage device 21 configuring a RAID group together with the storage device 21 that is the replacement target is not connected from among the plurality of HS's 21a as the HS 21a that is the replacing apparatus as the path connection condition. In this way, before and after the replacement of the storage device 21, the load and the redundancy of the path between the CM 10 and the DE 20 can be maintained.

Furthermore, the selection unit 112 selects an HS 21a satisfying the performance condition with reference to the storage device 21 that is the replacing apparatus with high priority from among the plurality of HS's 21a as an HS 21a that is the replacing apparatus. In this way, before and after the replacement of the storage device 21, the load and the redundancy of the path between the CM 10 and the DE 20 can be maintained.

In addition, in a case where the HS 21a of the selected first or second candidate satisfies the performance condition, the replacement processing unit 114 replaces the storage device 21 that is the replacement target with the HS 21a in which data has been written by the write processing unit 113. In this way, after the replacement of the storage device 21 that is the replacement target, copying-back (writing-back) for the storage device 21 after the replacement does not need to be performed. Accordingly, at least one of the following effects or advantages can be acquired.

(1) The state of the storage apparatus according to copying back does not need to be monitored.

(2) The operation of the storage apparatus does not need to wait in accordance with copying back, and the completion of the copying back does not need to be reported to the user.

(3) In the replacement of the storage device, since rebuilding or redundant copying and copying back are not repeated, a time required for the completion of the replacement can be shortened.

(4) The influence of copying back on the I/O performance can be reduced.

(5) In the replacement of the storage device, the usability of the storage device and the HS can be improved.

In addition, in a case where an HS 21a that does not satisfy the path connection condition or the performance condition is selected as an HS 21a that is the replacing apparatus, the detection unit 111 detects an HS 21a that becomes newly usable. In this way, even during the execution of rebuilding/redundant copying, a compatible HS that becomes newly usable can be detected, and accordingly, copying-back (wiring-back) for the storage device 21 after the replacement does not need to be performed. Accordingly, at least one of the above-described effects or advantages (1) to (5) can be acquired.

[B] Other

The disclosed technology is not limited to the embodiment described above, and may be variously changed in the range not departing from the concept of this embodiment. Each configuration and each process of this embodiment may be adopted or rejected as is necessary, or the configurations or the processes of the embodiment may be appropriately combined.

For example, it may be set in units of RAID groups or storage apparatuses 1 whether to perform the storage device replacing process (see FIG. 4B) of an example of the above-described embodiment. In other words, the RAID group or the storage apparatus 1 not performing the storage device replacing process (see FIG. 4B) performs the writing-back process (see FIG. 6B) regardless whether the HS 21a that is the replacing apparatus is either a compatible HS or an incompatible HS. In a case where it is set for each storage apparatus 1 whether to perform the storage device replacing process (see FIG. 4B), the same setting value is set in all the RAID groups.

According to the disclosed storage control device, the replacement of the storage device can be efficiently performed.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A storage control device that is communicably connected to a plurality of storage devices and a plurality of spare storage devices through a plurality of paths, the storage control device comprising:

a memory configured to store path information associating the plurality of spare storage devices and the plurality of paths with each other; and a selection unit configured to select a spare storage device that is a replacing apparatus from among the plurality of spare storage devices based on a path connection condition determined in accordance with a path in which the storage device that is a replacement target among the plurality of storage devices is connected and the path information, wherein the selection unit selects, as the spare storage device that is the replacing apparatus, a second spare storage device on a path, in which the storage device that is the replacement target or the storage device configuring a redundant arrays of inexpensive disks (RAID) group with the storage device that is the replacement target is not connected, from among the plurality of spare storage devices, as the path connection condition.

2. The storage control device according to claim 1, wherein the selection unit selects, as the spare storage device that is the replacing apparatus, a first spare storage device on the same path as the path in which the storage device that is the replacement target is connected from among the plurality of spare storage devices, as the path connection condition.

3. The storage control device according to claim 1, wherein the selection unit selects, as the spare storage device that is the replacing apparatus, with priority a spare storage device satisfying a performance condition with respect to the storage device that is the replacement target as reference from among the plurality of spare storage devices.

4. The storage control device according to claim 3, further comprising:
a write processing unit configured to write data stored by the storage device that is the replacement target in the selected spare storage device that is the replacing apparatus; and
a replacement processing unit configured to replace the storage device that is the replacement target by using the spare storage device in which the data is written by the write processing unit in a case where the first or second spare storage device that is selected satisfies the performance condition.

5. The storage control device according to claim 3, further comprising:
a write processing unit configured to write data stored by the storage device that is the replacement target in the selected spare storage device that is the replacing apparatus; and
a write-back processing unit configured to, in a case where the spare storage device that does not satisfy the path connection condition or the performance condition is selected as the spare storage device that is the replacing apparatus, after replacement of the storage device that is the replacement target, write back the data written into the spare storage device that is the replacing apparatus into the storage device that is the replacement target after the replacement.

6. The storage control device according to claim 3, further comprising a detection unit configured to detect a third spare storage device that newly becomes usable in a case where the spare storage device that does not satisfy the path connection condition or the performance condition is selected as the spare storage device that is the replacing apparatus,
wherein, in a case where the third spare storage device satisfies the path connection condition and the performance condition, the selection unit selects the third spare storage device as the spare storage device that is the replacing apparatus.

7. The storage control device according to claim 1, further comprising:

a write processing unit configured to write data stored by the storage device that is the replacement target in the selected spare storage device that is the replacing apparatus; and
a detection unit configured to detect a third spare storage device that newly becomes usable in a case where a fourth spare storage device that does not satisfy the path connection condition is selected as the spare storage device that is the replacing apparatus, wherein
in a case where the third spare storage device satisfies the path connection condition, the selection unit selects the third spare storage device as the spare storage device that is the replacing apparatus, and
the write processing unit continues to write data in the fourth spare storage device, writes data in the third spare storage device from a region which is not completed writing in the fourth spare storage device, and copies data which is written in the fourth spare storage device to the third spare storage device.

8. The storage control device according to claim 1, wherein
the memory stores the path information associating the plurality of storage devices and the plurality of spare storage devices with the plurality of paths with each other and RAID configuration information indicating RAID configuration of the plurality of storage devices, and
the selection unit selects the spare storage device that is the replacing apparatus based on the path connection condition, the path information, and the RAID configuration information, the spare storage device that is the replacing apparatus having highest redundancy from a viewpoint of a path connection.

9. The storage control device according to claim 8, wherein the selection unit selects the spare storage device that is the replacing apparatus satisfying the the path connection condition by identifying the plurality of paths which is connected to the plurality of storage devices and the plurality of spare storage devices based on the path information and identifying a storage device which configures the same RAID group with the storage device that is the replacement target based on the RAID configuration information.

10. A non-transitory computer-readable recording medium having stored therein a program for causing a computer included in a storage control device that is communicably connected to a plurality of storage devices and a plurality of spare storage devices through a plurality of paths to execute a process comprising:
storing path information associating the plurality of spare storage devices and the plurality of paths with each other;
selecting a spare storage device that is a replacing apparatus from among the plurality of spare storage devices based on a path connection condition determined in accordance with a path in which the storage device that is a replacement target among the plurality of storage devices is connected and the path information; and
selecting, as the spare storage device that is the replacing apparatus, a second spare storage device on a path, in which the storage device that is the replacement target or the storage device configuring a redundant arrays of inexpensive disks (RAID) group with the storage device that is the replacement target is not connected, from among the plurality of spare storage devices, as the path connection condition.

11. The non-transitory computer-readable recording medium having stored therein a program according to claim 10, the process further comprising selecting, as the spare storage device that is the replacing apparatus, a first spare storage device on the same path as the path in which the storage device that is the replacement target is connected from among the plurality of spare storage devices, as the path connection condition.

12. The non-transitory computer-readable recording medium having stored therein a program according to claim 10, the process further comprising, selecting, as the spare storage device that is the replacing apparatus, with priority a spare storage device satisfying a performance condition with respect to the storage device that is the replacement target as reference from among the plurality of spare storage devices.

13. The non-transitory computer-readable recording medium having stored therein a program according to claim 12, wherein the process further comprising:
    writing data stored by the storage device that is the replacement target in the selected spare storage device that is the replacing apparatus; and
    replacing the storage device that is the replacement target by using the spare storage device in which the data is written in a case where the first or second spare storage device that is selected satisfies the performance condition.

14. The non-transitory computer-readable recording medium having stored therein a program according to claim 12, wherein the process further comprising:
    writing data stored by the storage device that is the replacement target in the selected spare storage device that is the replacing apparatus; and
    after replacement of the storage device that is the replacement target, writing back the data written into the spare storage device that is the replacing apparatus into the storage device that is the replacement target after the replacement in a case where the spare storage device that does not satisfy the path connection condition or the performance condition is selected as the spare storage device that is the replacing apparatus.

15. The non-transitory computer-readable recording medium having stored therein a program according to claim 12, wherein the process further comprising:
    detecting a third spare storage device that newly becomes usable in a case where the spare storage device that does not satisfy the path connection condition or the performance condition is selected as the spare storage device that is the replacing apparatus; and
    selecting the third spare storage device as the spare storage device that is the replacing apparatus in a case where the third spare storage device satisfies the path connection condition and the performance condition.

16. A control method for a storage control device that is communicably connected to a plurality of storage devices and a plurality of spare storage devices through a plurality of paths, the control method comprising:
    storing path information associating the plurality of spare storage devices and the plurality of paths with each other;
    selecting a spare storage device that is a replacing apparatus from among the plurality of spare storage devices based on a path connection condition determined in accordance with a path in which the storage device that is a replacement target among the plurality of storage devices is connected and the path information; and
    selecting, as the spare storage device that is the replacing apparatus, a second spare storage device on a path, in which the storage device that is the replacement target or the storage device configuring a redundant arrays of inexpensive disks (RAID) group with the storage device that is the replacement target is not connected, from among the plurality of spare storage devices, as the path connection condition.

17. The control method according to claim 16, further comprising selecting, as the spare storage device that is the replacing apparatus, a first spare storage device on the same path as the path in which the storage device that is the replacement target is connected from among the plurality of spare storage devices, as the path connection condition.

18. The control method according to claim 16, further comprising selecting, as the spare storage device that is the replacing apparatus, with priority a spare storage device satisfying a performance condition with respect to the storage device that is the replacement target as reference from among the plurality of spare storage devices.

19. The control method according to claim 18, further comprising:
    writing data stored by the storage device that is the replacement target in the selected spare storage device that is the replacing apparatus; and
    replacing the storage device that is the replacement target by using the spare storage device in which the data is written in a case where the first or second spare storage device that is selected satisfies the performance condition.

20. The control method according to claim 18, further comprising:
    writing data stored by the storage device that is the replacement target in the selected spare storage device that is the replacing apparatus; and
    after replacement of the storage device that is the replacement target, writing back the data written into the spare storage device that is the replacing apparatus into the storage device that is the replacement target after the replacement in a case where the spare storage device that does not satisfy the path connection condition or the performance condition is selected as the spare storage device that is the replacing apparatus.

* * * * *